(12) United States Patent
Zheng et al.

(10) Patent No.: US 7,845,236 B2
(45) Date of Patent: Dec. 7, 2010

(54) RESISTIVE CONTACT SENSORS FOR LARGE BLADE AND AIRFOIL PRESSURE AND FLOW SEPARATION MEASUREMENTS

(75) Inventors: Danian Zheng, Simpsonville, SC (US);
Brandon S. Gerber, Ware Shoals, SC (US); Robert P. Grimley, Greer, SC (US); Kirk G. Pierce, Simpsonville, SC (US); Jay F. Leonard, Greenville, SC (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 12/237,670

(22) Filed: Sep. 25, 2008

(65) Prior Publication Data
US 2010/0050777 A1 Mar. 4, 2010

Related U.S. Application Data

(60) Provisional application No. 61/091,928, filed on Aug. 26, 2008.

(51) Int. Cl.
*G01L 9/06* (2006.01)
(52) U.S. Cl. ......................... 73/727; 415/118
(58) Field of Classification Search ............... None
See application file for complete search history.

(56) References Cited

U.S. PATENT DOCUMENTS

| | | | | |
|---|---|---|---|---|
| 3,857,287 A | * | 12/1974 | Sonderegger et al. | 73/706 |
| 4,890,498 A | * | 1/1990 | Dobler et al. | 73/727 |
| 2006/0137749 A1 | * | 6/2006 | Bonne et al. | 137/613 |
| 2006/0184067 A1 | | 8/2006 | Clark et al. | |
| 2007/0291964 A1 | * | 12/2007 | Chien et al. | 381/174 |
| 2008/0053236 A1 | * | 3/2008 | Gogoi et al. | 73/718 |
| 2010/0054916 A1 | * | 3/2010 | Zheng et al. | 415/118 |

* cited by examiner

*Primary Examiner*—Andre J Allen
(74) *Attorney, Agent, or Firm*—Edward J. Smith; Ernest G. Cusick; Frank A. Landgraff

(57) ABSTRACT

A fluid dynamic polymer-based contact sensor measures ambient pressure based on the resistivity changes across the sensor under different ambient pressures. The pressure sensor may applied to airfoil structures such as wind turbine blades without impacting the blade structure and fluid dynamic characteristics. The sensor may also be applied to fluid measurements. The pressure measurements are used to measure blade performance with high fidelity. The pressure measurements are transmitted to processing to determine blade characteristics and environment including flow separation, stagnation point, angle of attack, lift and drag and wind speed. Further processing of the pressure distribution may identify wind shear, up-flow and yaw error.

20 Claims, 13 Drawing Sheets

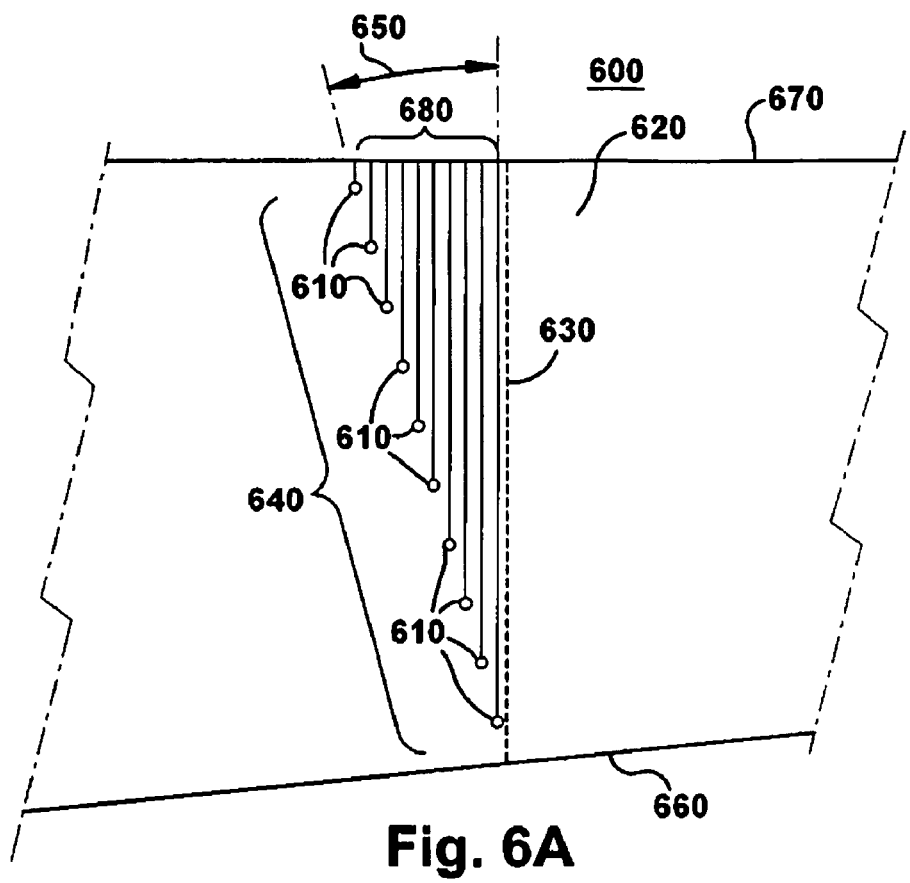
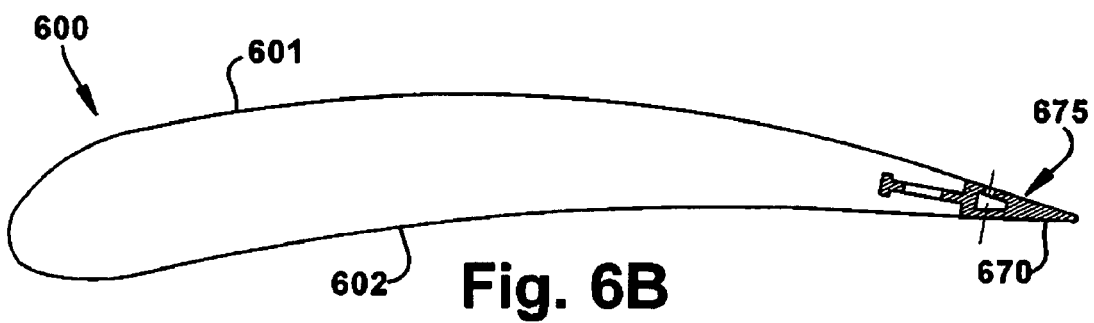
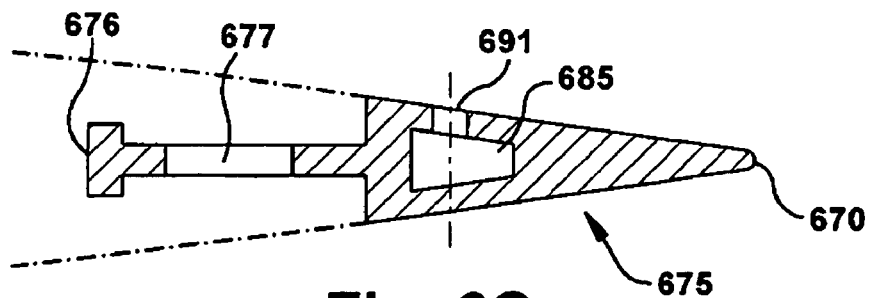
Fig. 6A
Fig. 6B
Fig. 6C

Fig. 6D  Fig. 6E

RESISTIVE CONTACT SENSORS FOR LARGE BLADE AND AIRFOIL PRESSURE AND FLOW SEPARATION MEASUREMENTS

RELATED APPLICATION

This application is related to and claims benefit from U.S. provisional application 61/091,928 by Danian Zheng et al., filed on Aug. 26, 2008. This application is also related to by Danian Zheng et al, filed on Sep. 25, 2008.

BACKGROUND OF THE INVENTION

The application relates generally to large blades and airfoils, and more specifically to sensors and instrumentation of wind turbine blades for blade performance measurements.

Measurement of blade fluid dynamic parameters for airfoils in general and wind turbine blades in particular have usually employed traditional methods of mechanical pressure detection. Such pressure detectors include piezo/strain-based pressure sensors that require a diaphragm to measure the pressure-induced stress and strain. Sizable ducts or penetrations are required in the airfoil or blade structure to accommodate the diaphragm package. This prevents the pressure measurement from being employed in production wind turbines. With such instrumentation, the pressure typically needs to be introduced into the sensor diaphragm by a nozzle and a tube, causing the directionality of the pressure measurement to be further limited.

Accordingly, there is a need to provide a structure for incorporating sensors on a wind turbine blade to provide pressure measurements that may be used for evaluating and controlling wind turbine performance. The sensors must be in place during wind turbine operation, so the installation must not adversely impact the integrity and fluid dynamic operation of the blade. Further, a structure is also required to provide the signals to a data acquisition system in a manner that does not adversely impact the integrity and fluid dynamic operation of the blade.

BRIEF DESCRIPTION OF THE INVENTION

The present invention relates to a fluid dynamic resistive contact sensor for measuring a fluid pressure on an airfoil, where the measured pressure may be an air pressure or a liquid pressure. The invention also relates airfoil instrument arrangements to permit the fluid dynamic sensor to measure performance parameters for the airfoil, which may be a wind turbine blade.

According to a first aspect of the present invention, a fluid dynamic resistive contact sensor, adapted for measuring a fluid pressure on an airfoil, is provided. The sensor includes an electrically-conductive pressure-sensitive element. An electrically-conductive base plate is operatively connected to one end of the pressure-sensitive element. An electrically-conductive pressure-sensing diaphragm is operatively connected to a second end of the pressure-sensitive element for applying a preload and sensing an ambient pressure-related force. An electrical insulator separates the base plate and the pressure-sensing diaphragm. Means for engaging the pressure-sensing diaphragm to the baseplate are provided. Means for supplying an electric current through the pressure-sensitive element are also provided According to another aspect of the present invention, a method for making a fluid dynamic resistive contact sensor adapted for measurement of fluid pressure is provided. The method includes providing an electrically-conductive base plate and mounting one end of a pressure-sensitive element on the base plate. The method further includes mounting an electrically-conductive, pressure-sensing diaphragm over a second end of the pressure-sensitive element and electrically isolating the pressure-sensing diaphragm from the base plate. The method further includes engaging the pressure-sensing diaphragm with the base plate.

According to yet another aspect of the present invention, a wind turbine blade instrumentation structure for an fluid dynamic resistive contact sensor adapted for measurement of fluid dynamic parameters related to wind turbine blade performance is provided. The structure includes a plurality of fluid dynamic resistive contact sensors comprising a pressure-sensitive conductive composite material formed of a polymer and a conductive filler, wherein the plurality of contact sensors are distributed according to a predetermined pattern on the surface of a wind turbine blade. The structure further includes a mounting structure for the plurality of fluid dynamic resistive contact sensors on the wind turbine blade, adapted to maintain the plurality of fluid dynamic resistive contact sensor fixed in place during wind turbine operation. Means are also provided for communicating electrically a signal between the plurality of fluid dynamic resistive contact sensor on the blade and a data acquisition terminal.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIG. 6A illustrates sensors mounted along a surface of the blade in skewed mounting pattern;

FIG. 6B illustrates a trailing edge insert on an blade;

FIG. 6C illustrates a expanded view of the trailing edge insert for a blade;

FIG. 6D illustrates a partial sectional view A-A for a channel within the trailing edge insert;

FIG. 6E illustrates a partial sectional view B-B through channel cavity access opening for the trailing edge insert;

DETAILED DESCRIPTION OF THE INVENTION

Figure 1A:
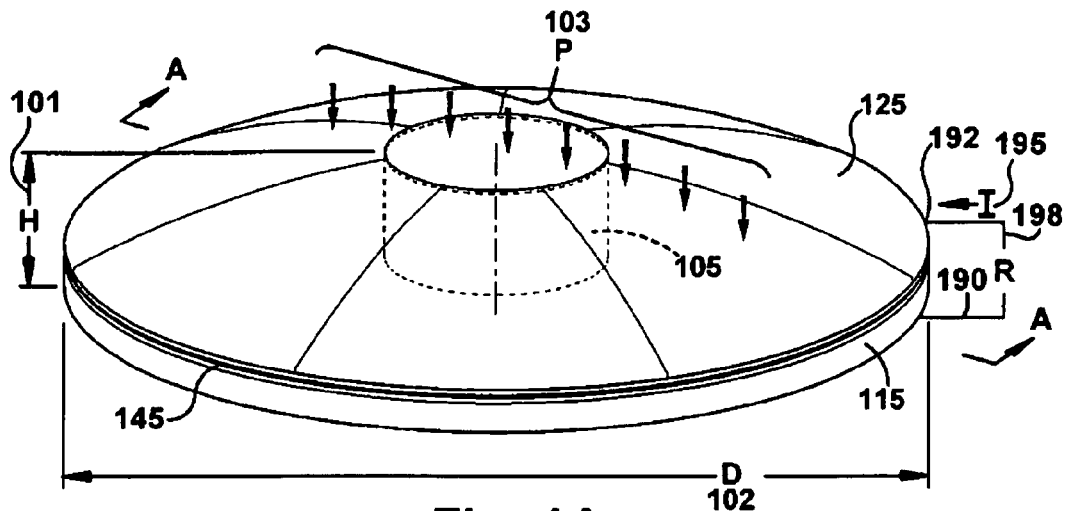
FIG. 1A illustrates an isometric view of one embodiment of an fluid dynamic pressure sensor for measuring a fluid pressure.

The following embodiments of the present invention have many advantages, including offering pressure sensors as thin streamlined patches on the turbine blade that do not impact the blade structure and fluid dynamic characteristics. The sensors permit the elimination of port and tubes, eliminating hysteresis, damping directionality and providing increased frequency response relative to previous mechanical pressure measurements, thereby achieving a more accurate measurement. Further the thin patches of the sensor may permit incorporation into the blade surface for real time wind turbine performance measurement and real time turbine control capabilities. Additionally, the contact patches may be applied to the surface for diagnostic and validation purposes.

Recently, various contact sensors have been developed, which include a conductive composite material formed of a polymer and a conductive filler. The composite materials of the contact sensor may have physical characteristics essentially identical to the polymer while being electrically conductive with the electrical resistance as a function of the load on the sensors. The sensors may provide real time dynamic information relative to information related to load. Previous applications as described by Clark et al. (U.S. 2006/0184067) relate to measurement of parameters associated with contact stress (direct physical contact with the sensing element material). In contact applications as described in Clark et al., the force applied to the sensors relates to contact between members such as contact that take place within joint surfaces within a human body, such as a knee or hip joint. Such contact provides a positive force acting on the sensor.

The present invention relates to a fluid dynamic sensor for measuring a fluid pressure, where the measured fluid pressure may be a gas pressure or a liquid pressure. The measurement of fluid pressure provides the flow field information that facilitates the fluid dynamic design and control. The fluid pressure may be measured on the surface of an airfoil that may be, but is not limited to be, a wind turbine blade. The gas pressure measured may be an air pressure. In the case of the air pressure, the measurement may comprise ambient air pressure, including changes around a standard atmospheric pressure as an effect of the flow field around the blade air foil. Therefore, a sensor is needed to respond to both positive and negative changes about standard atmospheric pressure. The inventive sensor is preloaded to apply a force to a pressure-sensitive material to establish an operating point allowing a response to pressure changes both above and below the standard ambient pressure.

For application to precise pressure measurements for determination of fluid dynamic performance of the structures to which the sensor is mounted, the sensor and the sensor mounting scheme must be fluid dynamically streamlined so as not to interfere with the airflow along the surface.

The fluid dynamic sensor, adapted for measuring a fluid pressure, includes a pressure-sensitive element; an electrically-conductive base plate operatively connected to one end of the pressure-sensitive element; an electrically-conductive pressure-sensing diaphragm operatively connected to a second end of the pressure-sensitive element and adapted for applying a preload and an ambient pressure-related force to the pressure-sensitive element. An electrical insulator separates the base plate and the pressure-sensing diaphragm. Means are provided for engaging the pressure-sensing diaphragm to the baseplate. Means are also provided for supplying an electric current through the pressure-sensitive element.

Figure 1B:
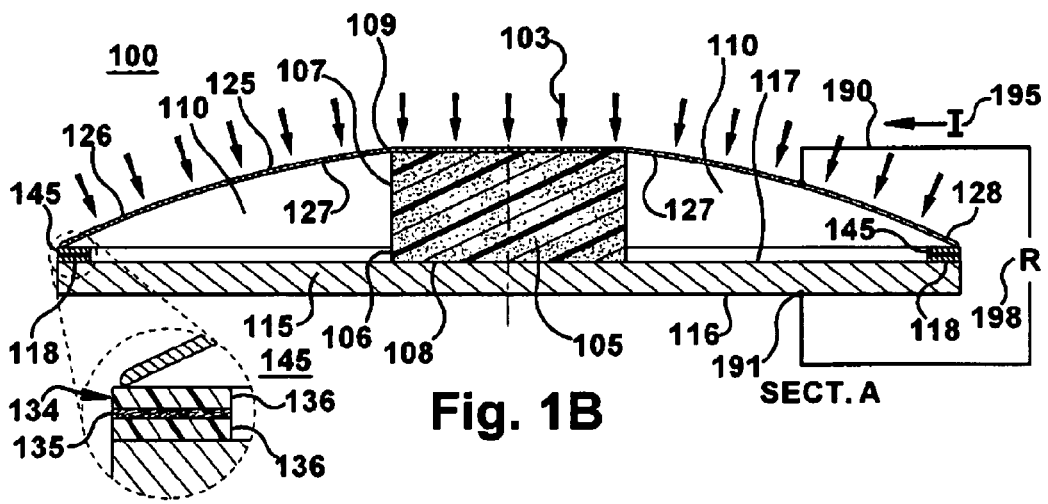
FIG. 1B illustrates a cross-section of one embodiment of the fluid dynamic resistive contact pressure sensor.
Figure 1C:
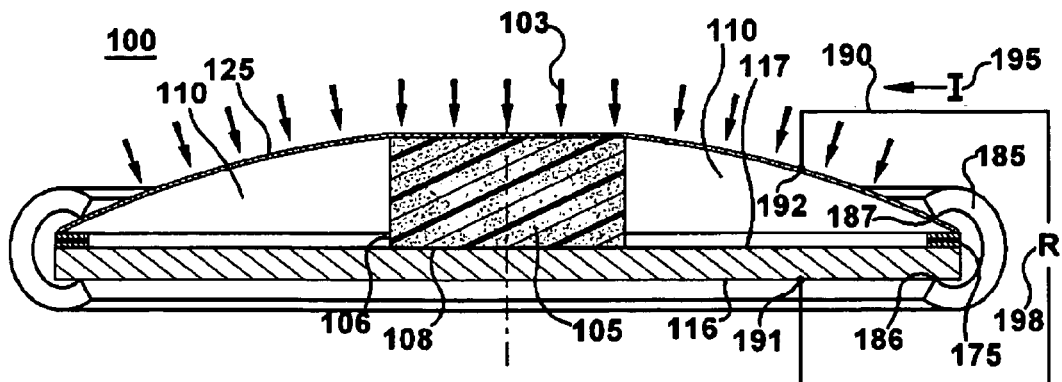
FIG. 1C illustrates a cross-section of a second embodiment of the fluid dynamic resistive contact pressure sensor employing a non-metallic clamp for engaging a base plate and a pressure-sensing diaphragm.

FIG. 1A illustrates an isometric view of one embodiment of a fluid dynamic resistive contact sensor 100 for measuring a fluid pressure. The fluid pressure may be measured on the surface of an airfoil. The fluid pressure may be an air pressure and the airfoil may be, but is not limited, as being a wind turbine blade. FIG. 1B illustrates a cross-section view of the one embodiment for the fluid dynamic resistive contact sensor 100. FIG. 1C illustrates a cross-section view of a second embodiment for the fluid dynamic resistive contact sensor 100.

A pressure-sensing element 105 may be disposed between a base plate 115 at a first end 106 of the pressure-sensing element and a pressure-sensitive diaphragm 125 at a second end 107. The base plate 115 may be configured as a flat plate of an electrically conductive high strength material, such as stainless steel. The base plate 115 is sufficiently strong to avoid physical distortion in response to ambient pressure changes. The base plate 15 may be further shaped as a disc. The material for the base plate 115 may also include other high strength electrically conductive materials such as aluminum, for example. The bottom surface 116 of the base plate 115 may be planar. The bottom surface 116 of the base plate 115 may also include a curvature, adapted for placement at a particular location of measurement on a surface. Here, the curvature of the bottom surface 116 may be set to correspond to the curvature of a surface to which the base plate is to be mounted. The top surface 117 of the base plate 115 may be planar.

In one embodiment of the sensor 100, the pressure-sensitive element 105 is comprised of a conductive composite material formed of a polymer and a conductive filler. In another embodiment of the sensor, the pressure-sensitive element 105 may be formed of a piezoelectric material or an element with a piezo-electric coating layer on top, in the middle or at the bottom of it. The pressure-sensitive element 105 may be shaped as a button or disc, and may include an essentially flat surface 108 at the first end 106 and a surface 109 at the second end 107, which engage the base plate 115 and the pressure-sensing diaphragm 125, respectively.

The pressure-sensing diaphragm 125 (also referred to as dome) may comprise a thin metallic film. The thin metallic film should preferably be composed of a high strength, electrically conductive material, such as stainless steel for example. The material for the pressure-sensing diaphragm 125 may also include other high strength, conductive materials such as aluminum, for example. The pressure-sensing diaphragm 125 may be mounted over the second end 107 of the pressure-sensitive element 105 forming a dome over the base plate 115. The dome formed by the pressure-sensing element 105 may flare-out to an outer peripheral section 128 above the top surface 117 of the base plate 115 and extend to a radius approximately equivalent to that for the disc of the base plate 115. A cavity 110 is formed between the dome 125 and the base plate 115 in the space not occupied by the pressure-sensitive element 105

Figure 1D:
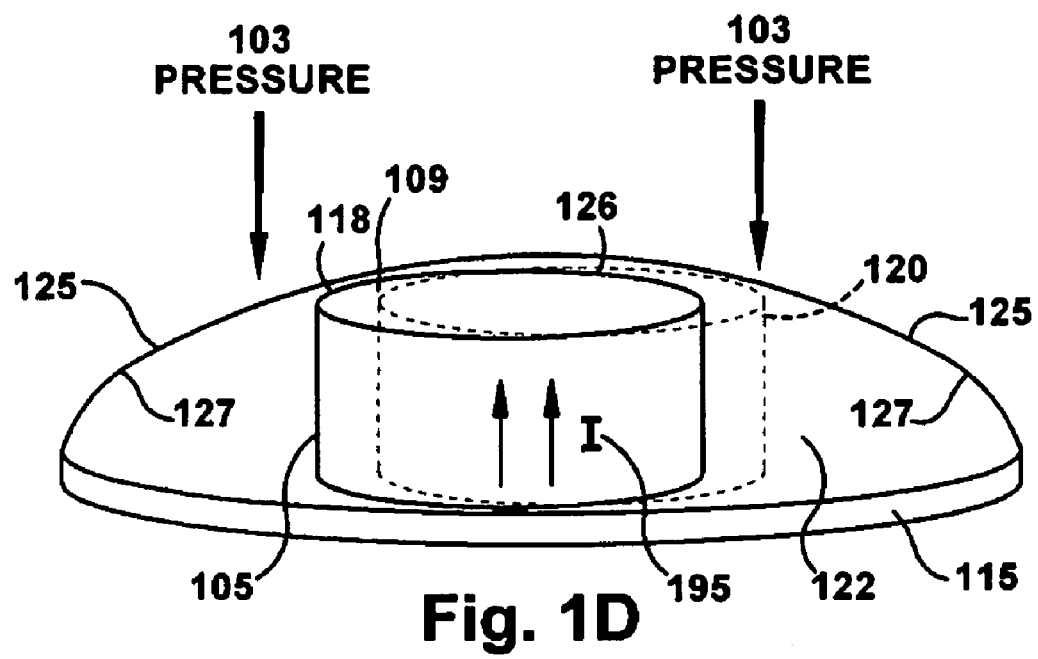
FIG. 1D illustrates changes in contact between a top surface of a flat shape for the pressure-sensitive element and the pressure-sensing diaphragm based on positioning of the pressure-sensitive element on the base plate.

FIG. 1D illustrates changes in contact 120 between a top surface 109 of a flat shape for the pressure-sensitive element 105 and the pressure-sensing diaphragm 125 based on positioning of the pressure-sensitive element 105 on the base plate 115. The top surface 109 of the pressure-sensing element 105 may be flat, making a circular-line contact 118 with the an underside 127 of the dome-shaped pressure-sensing diaphragm 125 around an outer circumference 104. Contact between the outer circumference 104 of the flat top surface 109 with the dome 125 will be somewhat influenced by an altered positioning 120 of the pressure-sensitive element on the base plate 115 resulting in a contact area induced variance in the pressure measurement.

Figure 1E:
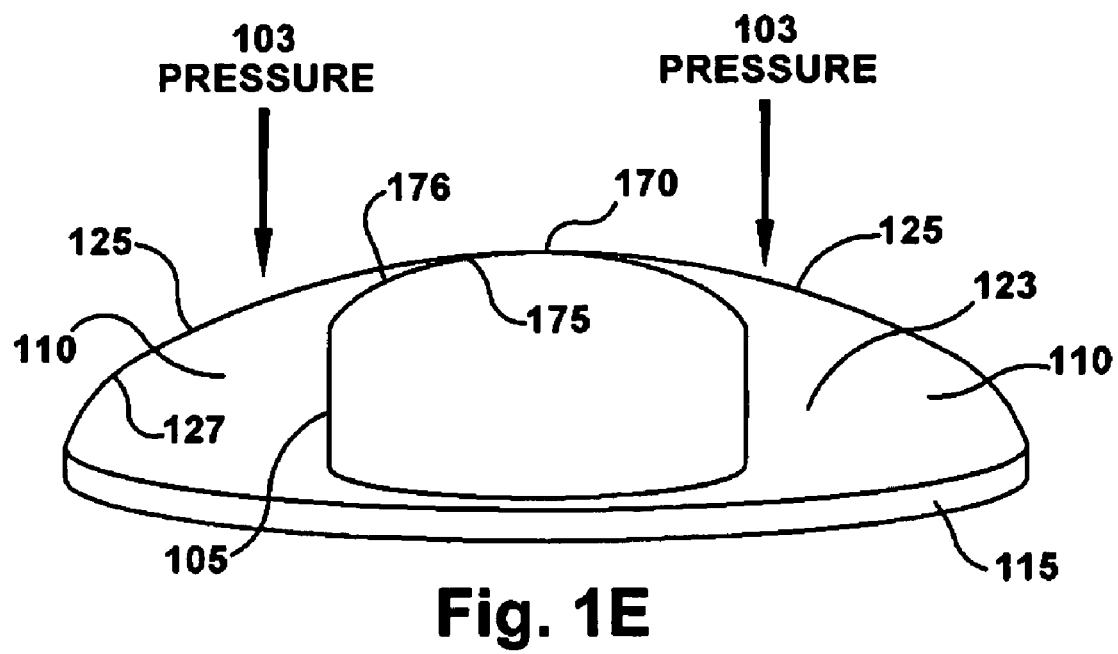
FIG. 1E illustrates the contact between a crown of the convex top surface of the pressure-sensitive element 105 and the pressure-sensing diaphragm.

To minimize the contact area induced variance in the pressure measurement, the top surface 109 of the pressure-sensing element 105 may include a convex shape that conforms to the underside 127 of the dome 125. A further aspect of the top surface for the pressure-sensing element may include a convex shape curvature unequal to the curvature of the underside 127 of the dome 125. In this aspect, only a crown 175 of pressure-sensing element 105 contacts the dome 125. The contact area between the crown 175 and the dome 125 is maintained relatively constant independent of positioning of the pressure-sensing element 105 on the base plate 115, thereby achieving a more constant electric current flux on the pressure-sensing element 105 and hence a more repeatable pressure signal. FIG. 1E illustrates the contact between a crown 175 of the convex top surface 176 of the pressure-sensitive element 105 and the pressure-sensing diaphragm 125. The sensor provides for a measurement over a range of about +/−4000 pascals with an accuracy of about or below 1 percent.

Figure 1F:
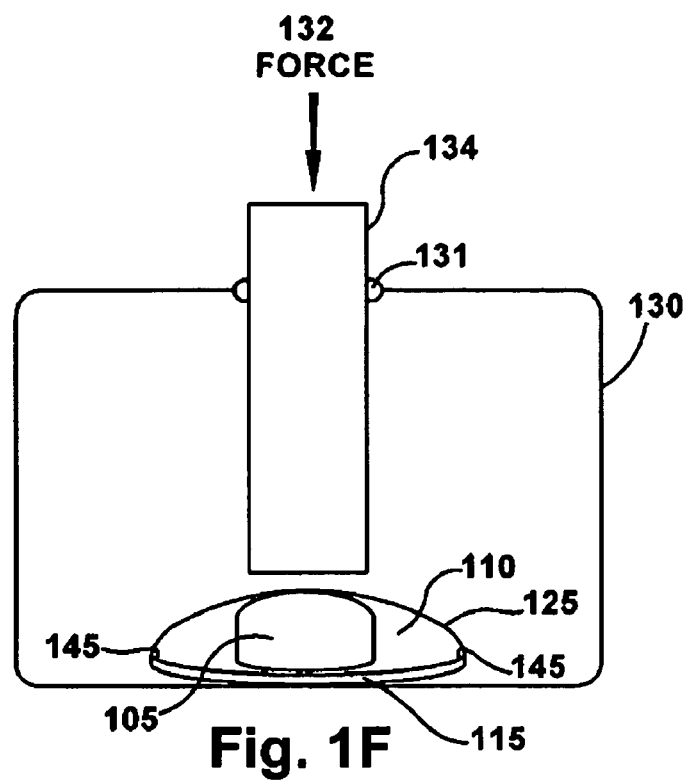
FIG. 1F illustrates the process for drawing a vacuum on the sensor cavity.
Figure 1G:
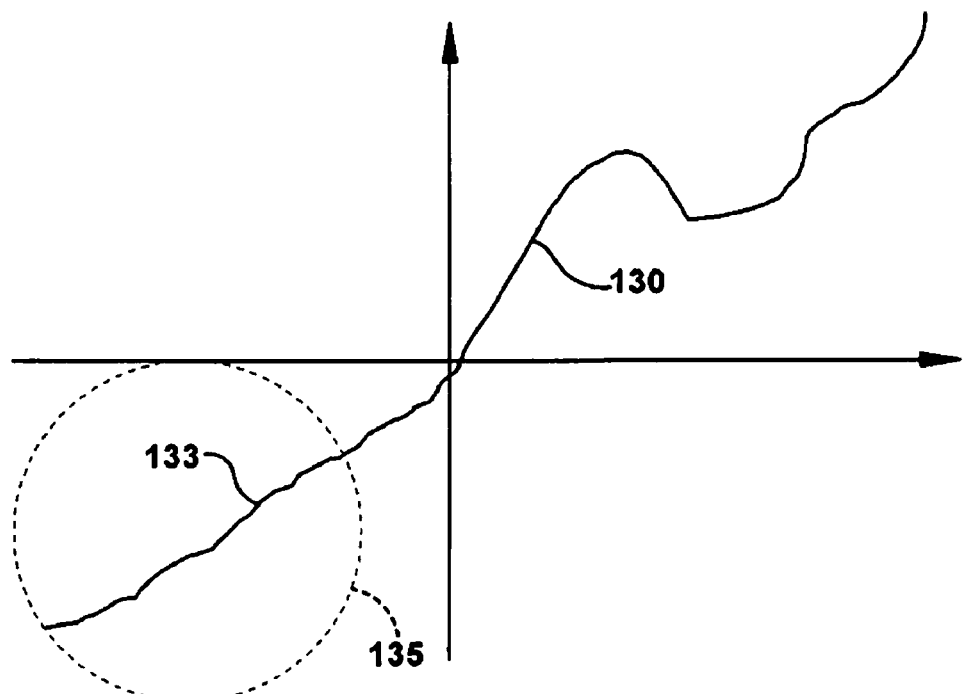
FIG. 1G illustrates the linearity of the pressure output signal from the sensor in the pressure mode.

FIG. 1G illustrates a representation for the linearity of the pressure output signal from the sensor in the pressure mode. In a further aspect of the present invention, a vacuum may be drawn in an internal cavity 110 of the sensor 100 between the base plate 115 and the pressure-sensing diaphragm 125. Removal of air from the internal cavity 110 improves the performance of the sensor 100 in two ways. The sensing current 195 flows through the resistance of the pressure-sensitive element 105 generates heat, which would warm air in the internal cavity and cause a pressure change internal to the sensor 100. The change in internal pressure within the cavity 110, impacts the force on the pressure-sensitive element 105 and changes the sensor pressure signal. Further, evacuating the internal cavity 110 maintains the pressure-sensitive element 105 in a pressure mode 135 where the linearity 133 of the pressure signal output 130 is enhanced relative to a condition wherein the pressure inside the internal cavity 110 is higher than the pressure outside the sensor 100.

The outer peripheral section 128 of the pressure-sensing diaphragm 105 may be maintained physically and electrically separated from the base plate 115 by an electrical insulator 145, which may be an insulating membrane. The electrically insulating membrane may be an epoxy membrane. Further, as illustrated in the inset for FIG. 1B, the electrical insulator 145 may include a composite membrane 134 based on a paper film 135 or other washer with an epoxy membrane 136. Electrical isolation is required between the base plate 115 and the pressure-sensing diaphragm 125 to capture a pressure-related electrical signal. For the conductive composite material formed of a polymer and a conductive filler, resistance values between the opposing ends of the pressure-sensitive element 105, change in response to the ambient pressure imposed on the pressure-sensing diaphragm 125.

The pressure-sensing diaphragm 125 must be maintained engaged with the base plate 115, even though as described above, it must be maintained electrically and hence physically isolated from base plate 115. Engagement may be maintained by the epoxy membrane described above, sealing the outer peripheral surface 128 of the pressure-sensing diaphragm 125 to the outer peripheral surface of the base plate 115, while providing electrical isolation.

Where an electrical insulator 145 without adhesive capability is provided between the pressure-sensing diaphragm 125 and the base plate 115, an electrically-insulating (non-metallic) clamp 185 may be provided to clamp the pressure-sensing diaphragm 125 and the base plate 115 together on the outer edges, as illustrated in FIG. 1C.

Engagement between the pressure-sensing diaphragm and the base plate 115 places maintains the dome in tension, applying a preload force 165 on the pressure-sensitive element 105. The precise positioning of the dome when engaged with the base plate through the epoxy membrane or a clamp on the outside edges establishes the magnitude of the preload force 165. The preload force 165 allows a compressive force to be maintained on the pressure-sensitive element 105 (and therefore a pressure-related resistance output) even when the ambient pressure for the contact sensor drops below the nominal ambient pressure.

The flat base plate 115 has a significant stiffness, such that it does not distort significantly as outside pressure 103 changes. The pressure-sensing diaphragm 105, being sufficiently thin, responds to changes in outside pressure 103 applied to the top surface 126 by distorting. Increased outside pressure 103 distorts the dome 125 downward on the pressure-sensitive element 105, applying a greater force with increasing pressure. Decreased outside pressure 103 reduces the downward distortion of the dome 125 and the force on the pressure-sensitive element 105.

Changes in the force on the pressure-sensitive element 105 change the resistance between the one end 106 and the second end 107. Because the dome 125 and the base plate 115 are physically separated by an electrical insulator 145, an exterior potential may be applied on wiring 190 between a location 191 on the base plate 115 and a location 192 on the pressure-sensing diaphragm 125, driving an electrical current (I) 195 to sense the variation in resistance 198 of the pressure-sensing element 105 in response to ambient pressure 103.

Overall height of the sensor 100 reduces interference with the airflow over the surface of the sensor. Maintaining an overall height (H) (101, FIG. 1A) of the sensor to about 2 mm will limit interference with laminar flow over the surface for which pressure measurements may be taken, such as on the surface of a wind turbine blade or a wing. Further, the dome shape for the pressure-sensing diaphragm provides a smooth surface consistent with reducing interference with airflow over the surface. Overall, the diameter (D) (102, FIG. 1A) of the fluid dynamic sensor may be limited to about 25 mm.

Figure 2:
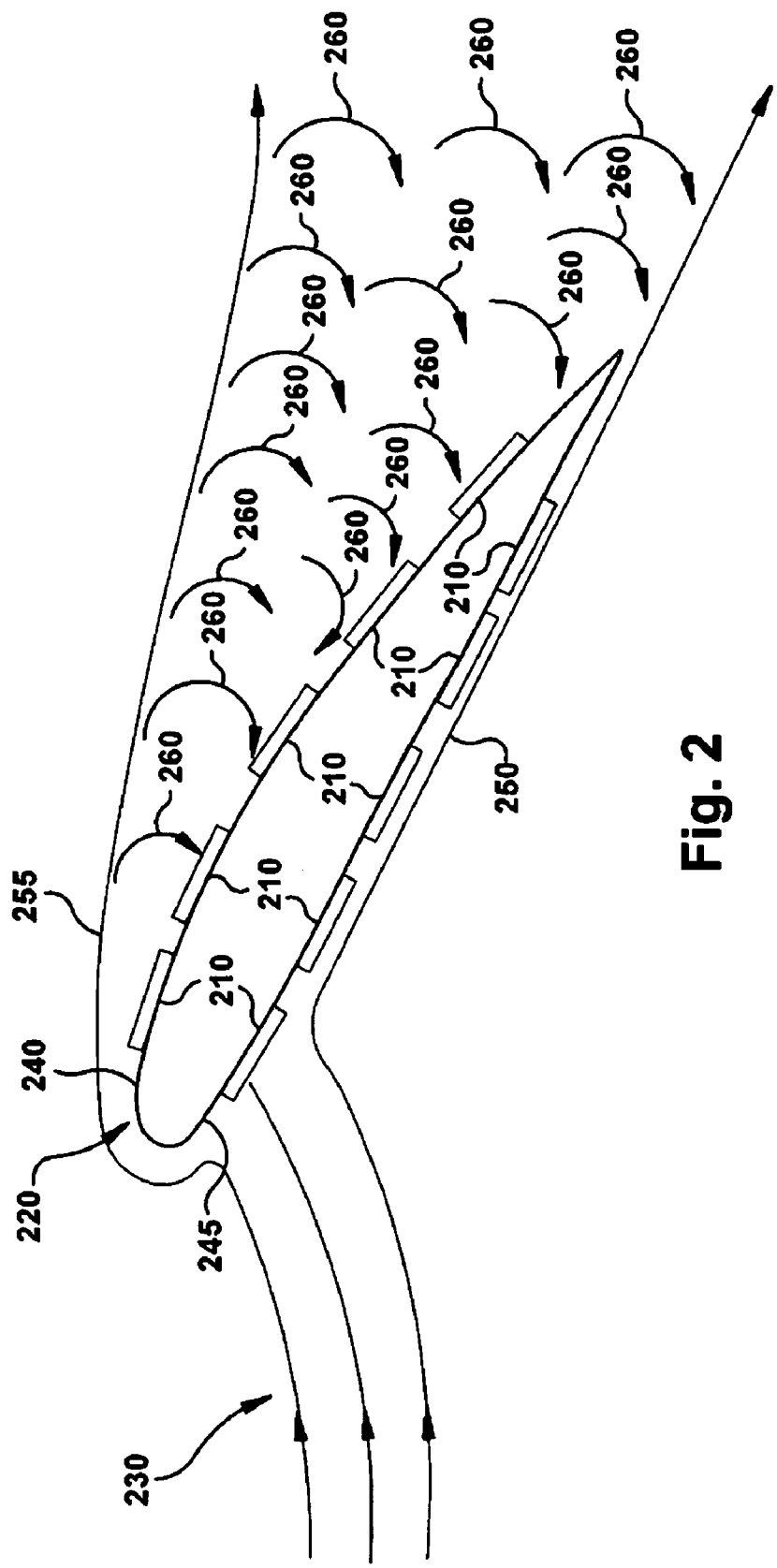
FIG. 2 illustrates an arrangement of the fluid dynamic resistive contact sensors mounted on an airfoil.

FIG. 2 illustrates an arrangement of the fluid dynamic resistive contact sensors 210 mounted on an airfoil 220. The sensors are disposed along a chord of the airfoil on an upper surface 240 and a lower surface 245. An incident airstream 230 impinges on the airfoil 220. The incident airstream 230 flows around the upper surface 240 and the lower surfaces 245 of the airfoil 220. The airfoil 220 is shown at stall, with a smooth airflow 250 along the lower surface 240, but a flow separation 255 creating a wake 260 above the upper surface 240. Pressure measurements by the sensors 210 may provide data to diagnose stall, angle of attack and other fluid dynamic conditions relative to airfoil performance.

Figure 3:
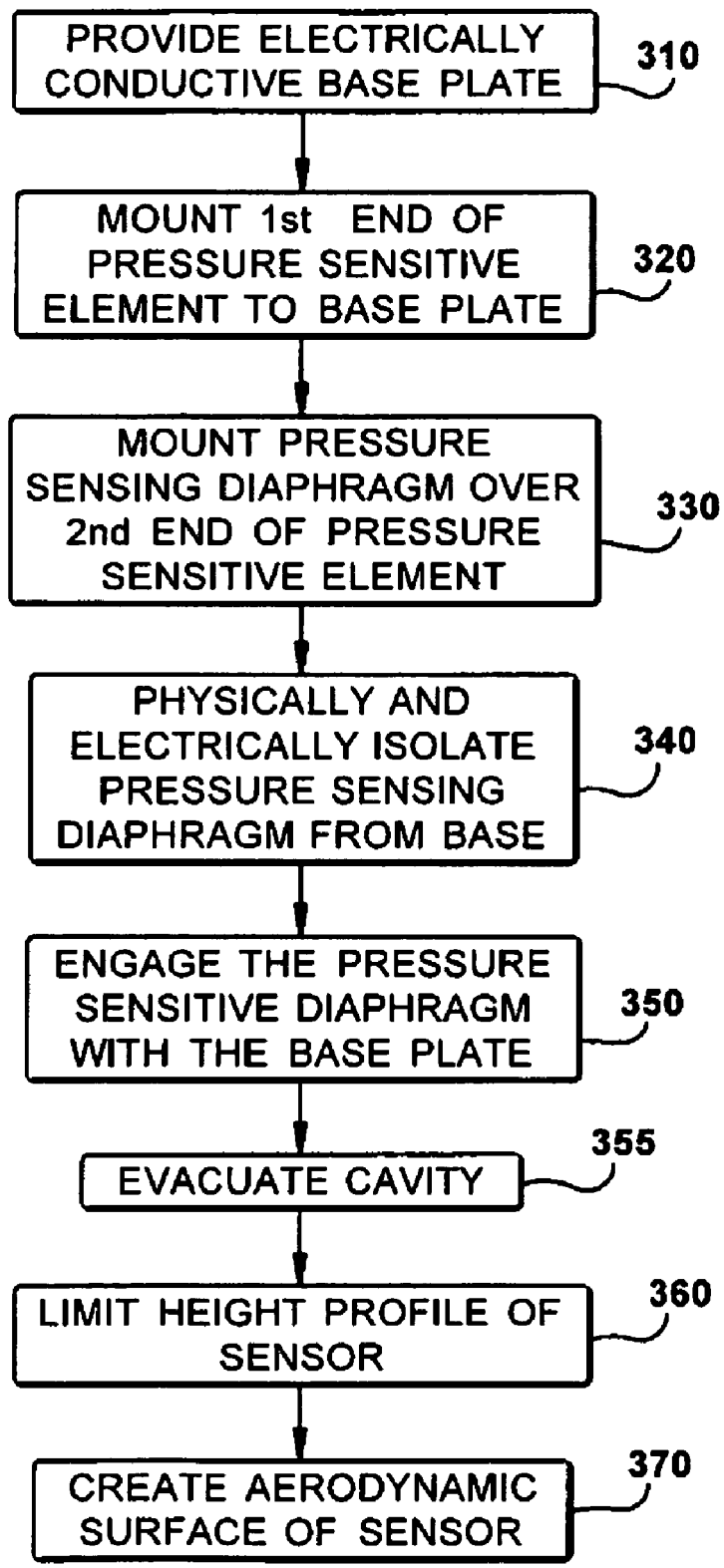
FIG. 3 illustrates a flowchart for the method of making the fluid dynamic resistive contact pressure sensor.

A further aspect of the present invention provides a method for making an fluid dynamic resistive contact sensor adapted for measurement of fluid pressure external to the sensor. FIG. 3 illustrates a flowchart for the method. In step 310, an electrically conductive base plate 115 is provided. The step of providing may further include shaping a bottom surface 116 of the base-plate 115 for mounting on one of a planar surface and a contoured surfaced, such as the surface of an airfoil, blade or wing. Step 320 includes mounting a first end 106 of a pressure-sensitive element 105 to the base plate 115.

Step 330 provides for mounting an electrically conductive pressure-sensing diaphragm 125 over a second end 107 of the pressure-sensitive element 105. The step of mounting may further include positioning the pressure-sensing diaphragm 125 over a second end 107 of the pressure-sensitive element 105 to form a dome over the base plate 115. Step 340 includes physically and electrically isolating the pressure-sensing diaphragm 125 from the base plate 115. Such isolating may include inserting an electrically insulator 145 between the base plate and the pressure-sensitive element. Such inserting may be more particularly applied to an outer peripheral base 128 of the pressure-sensing diaphragm 125 and an outer peripheral surface of the base plate 115. The step of inserting the electrical insulator 145 may further include inserting an epoxy membrane, which acts as an insulator. The step of inserting may also include inserting a composite membrane 134 of epoxy 136 and other material such a paper washer 135.

Step 350 directs engaging the pressure-sensing diaphragm 125 with the base plate 115. The step of engaging the pressure-sensing diaphragm 125 with the base plate 115 may further include positioning the pressure-sensing diaphragm 125 to establish a designated preload 165 on the pressure-sensitive element 105. The step of positioning may further include establishing a minimum for the designated preload according to an anticipated range of ambient pressure below the nominal ambient pressure. The step of engaging may also include engaging an outer peripheral base of the the pressure-sensing diaphragm to an outer peripheral surface of the base plate with the electrical insulator 145 of an epoxy membrane or with an electrically insulating clamp 185.

Step 355 may further include evacuating the internal cavity 110 of the sensor 100. The internal cavity 110 may be evacuated by maintaining the sensor in an evacuated chamber 130 during the engaging of the pressure-sensing diaphragm 125 with the base plate 115. When an evacuation is performed, the step may include providing a pressing mechanism for compressing the pressure-sensing diaphragm thorough an enclosure with seals for the side of the pressing mechanism. FIG. 1F illustrates the process for drawing a vacuum on the cavity 110 between the base plate 115 and the dome 125 when the dome 125 is engaged with the base plate 115 while encapsulating the pressure-sensitive element 105. The process is performed in a vacuum chamber 130 with seals 131 as force 132 is applied to pressing mechanism 134 to engage dome 125 with base plate 115 over the pressure-sensitive element 105 with a designated preload, as insulating membrane 145 seals the sensor and maintains the vacuum in the internal cavity 110.

The method for making a fluid dynamic resistive contact sensor 100 further includes according to Step 360, providing height of the fluid dynamic sensor at less than a height for a boundary layer of airflow on a blade. The method further includes according to Step 370, shaping a contoured profile for the sensor up to the height by providing a domed surface.

A further aspect of the present invention is an instrumentation structure for the fluid dynamic resistive contact sensors (sensors) adapted for measurement of fluid dynamic parameters related to airfoil, blade and wing performance. The following embodiments are directed to an instrumentation scheme for measurement of wind turbine blade performance, however, the instrumentation schemes are not limited to wind turbine blades.

The structure includes multiple sensors preferentially utilizing a conductive composite material formed of a polymer and a conductive filler. The contact sensors may be distributed according to a predetermined pattern on the surface of a wind turbine blade. A mounting structure for the plurality of fluid dynamic resistive contact sensor on the wind turbine blade is adapted to maintain the sensors fixed in place during during wind turbine operation. Means are provided for communicating electrically a signal between the plurality of fluid dynamic resistive contact sensor on the blade and a data acquisition terminal.

Figure 4A:
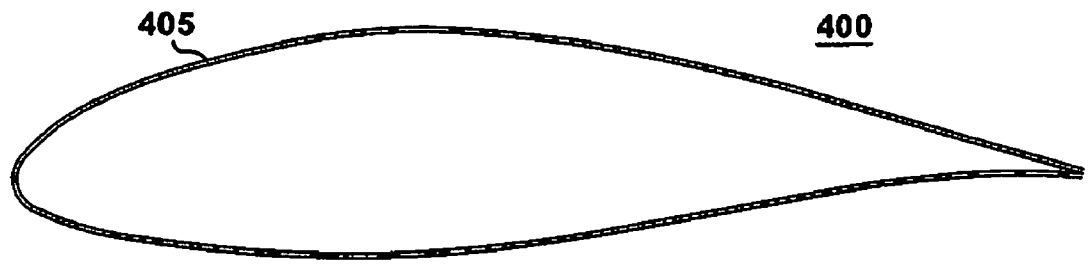
FIG. 4A illustrates fluid dynamic resistive contact pressure sensors distributed along a full chord of a blade providing capture of the full pressure distribution around the airfoil.
Figure 4B:
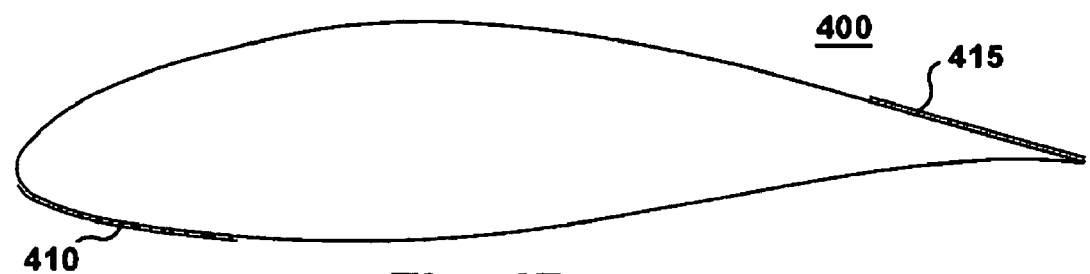
FIG. 4B illustrates fluid dynamic resistive contact pressure sensors distributed along the leading edge pressure surface that may provide specific information relating to stagnation point and angle of attack, and distributed along a trailing edge that may provide for acquiring stall data at the chord.
Figure 4C:
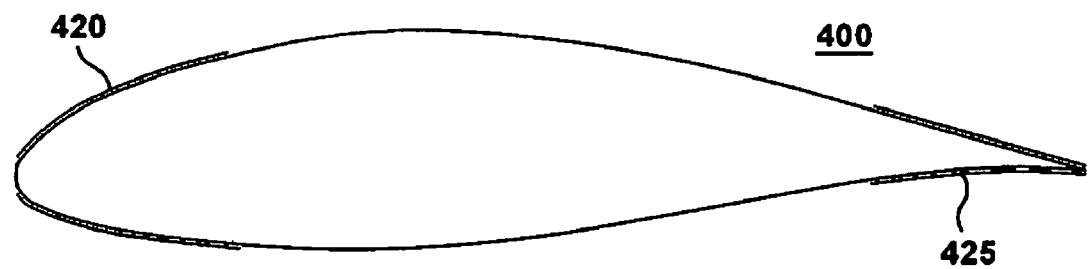
FIG. 4C illustrates fluid dynamic resistive contact pressure sensor distributed along at least one of a full leading edge and a full trailing edge.
Figure 4D:
FIG. 4D illustrates leading edge suction peak pressure and rooftop pressure may be captured with fluid dynamic resistive contact pressure sensors distributed on a leading edge suction surface.

The predetermined pattern of the sensors is established according to the fluid dynamic information desired to be achieved. Multiple sensors may be mounted generally along a surface of at least one chord of the blade distributed along upper and lower surfaces. In FIGS. 4A-4D, a cross section of view of an airfoil 400, which may be a wind turbine blade, is shown. FIG. 4A illustrates a distribution of the sensors along a full chord 405 providing capture of the full pressure distribution around the airfoil. FIG. 4B illustrates sensors distributed along the leading edge pressure surface 410 (about 20% of the full chord) for specific information relating to stagnation point and angle of attack and along a trailing edge 415 (about 20% of full chord) for acquiring stall data at the chord. FIG. 4C illustrates sensors distributed along at least one of a full leading edge 420 and a full trailing edge 425 (each 20% of a chord). Leading edge suction peak pressure and rooftop pressure may be captured with sensors distributed on a leading edge suction surface 430 (about 50% of chord) as illustrated in FIG. 4D.

Figure 5A:
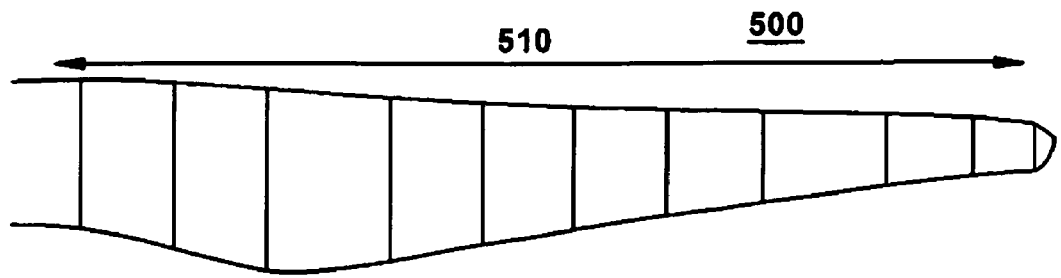
FIGS. 5A-5E, respectively, illustrate fluid dynamic resistive contact pressure sensor provided for a full span distribution; an outer 1/3 span, a blade tip outer span; an inner 1/3 span; and a middle span.
Figure 5B:
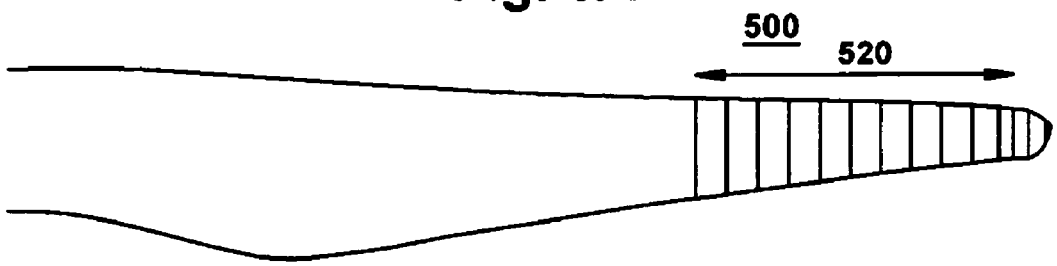
Figure 5C:
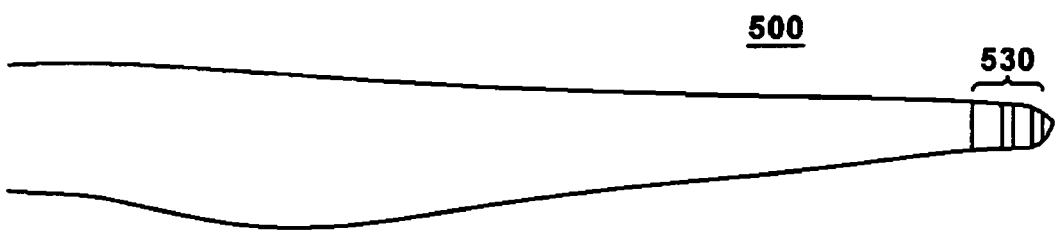
Figure 5D:
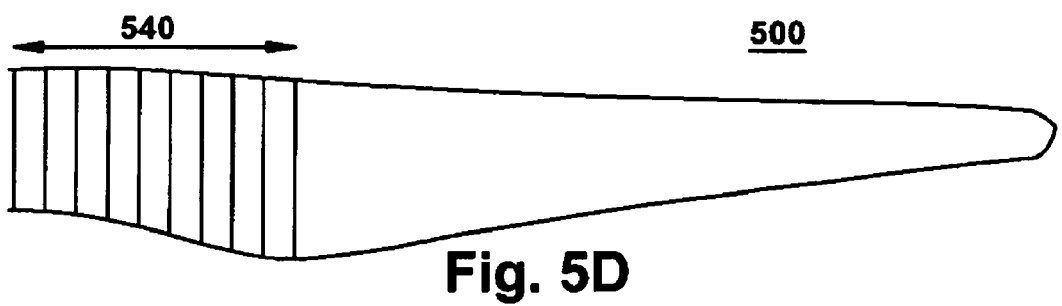
Figure 5E:
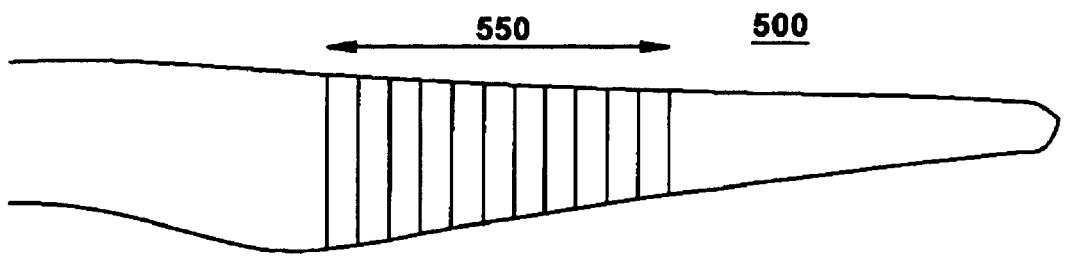

Multiple sensors may be similarly provided along multiple chords of the blade selected at predetermined axial positions. FIGS. 5A-5E illustrate sensor distribution on the blade 500. The sensors may be provided for full span distribution 510 as shown in FIG. 5A; an outer ⅓ span 520 as shown in FIG. 5B; a blade tip outer span 530 as shown in FIG. 5C; an inner ⅓ span 540 as shown in FIG. 5D; and a middle span 550 as shown in FIG. 5E.

FIG. 6A illustrates sensors 610 mounted generally along a surface 620 of at least one chordline 630 of the blade 600 that may be established generally in skewed mounting pattern 640 with respect to a chordline 630 between a leading edge 660 and trailing edge 670. Such a skewed mounting pattern minimizes interference of one sensor with airflow pattern over the blade 600 and hence pressure for a downstream sensor along the chord of the blade. The skewed mounting pattern 640 of sensors with respect to the chordline 630 may form an angle 650 of up to about 15 degrees. Such a limited offset from the chordline 630 does not produce a significant change in measured pressure from the pressure at a corresponding location on the chordline itself. If the sensors 610 are mounted on the exterior surface of the blade, the wiring 680 may be run along the blade surface 620 to a trailing edge 670 and then grouped into bundles 690 along the trailing edge insert 675 as shown in FIG. 6A. Routing features are designed to ensure minimum flow disruption and provide weather and environmental protection for the sensor wiring.

FIG. 6B illustrates a trailing edge insert on an blade. FIG. 6C illustrates a expanded view of the trailing edge insert for a blade. FIG. 6D illustrates a partial sectional view A-A for a channel within the trailing edge insert. FIG. 6E illustrates a partial sectional view B-B through channel cavity access opening for the trailing edge insert.

Blade 600 includes a suction side 601 and a pressure side 602. A preference for routing sensor leads 692 is on the pressure side 602, as much as is practical. On trailing edge 670 of the blade, a trailing edge insert 675 may be provided. The trailing edge insert 675 may be comprised of a metal or a composite substance. Expanded view FIG. 6C shows the trailing edge insert 675 tapering at the trailing edge 670 and including staking elements 676 and 677 for maintaining the trailing edge insert 675 in place on the blade 600. The trailing edge insert 675 includes a longitudinal channel cavity 685 for running sensor leads 691.

FIG. 6D illustrates a partial section blade view from the suction surface 601 that illustrates a channel access opening 691 from the suction surface 601 of the blade into the channel cavity 685 for sensor leads. FIG. 6E illustrates a partial section B-B view for channel access openings 691 penetrating the trailing edge insert 675 into the longitudinal channel cavity 685. Sensor leads 692 pass through the channel access openings 691 into the longitudinal channel cavity 685. The access openings 691 may form an angle of entry 694 of approximately 15 degrees to approximately 30 degrees depending on material, channel width, channel wall thickness and sensor wire size choice.

Figure 7:
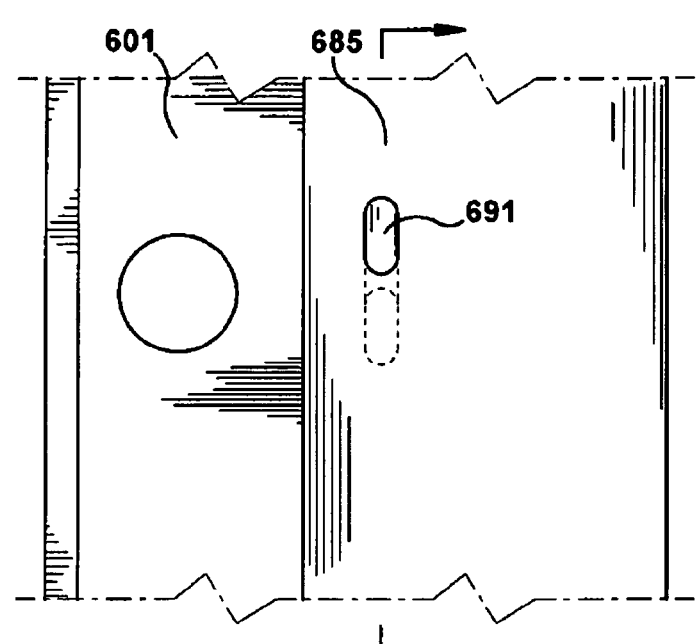
FIG. 7 illustrates an exemplary distribution of fluid dynamic resistive contact sensors along chords of a wind turbine blade for a testing.
Figure 7:
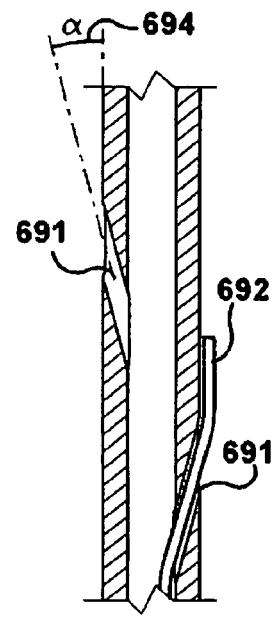
Figure 7:
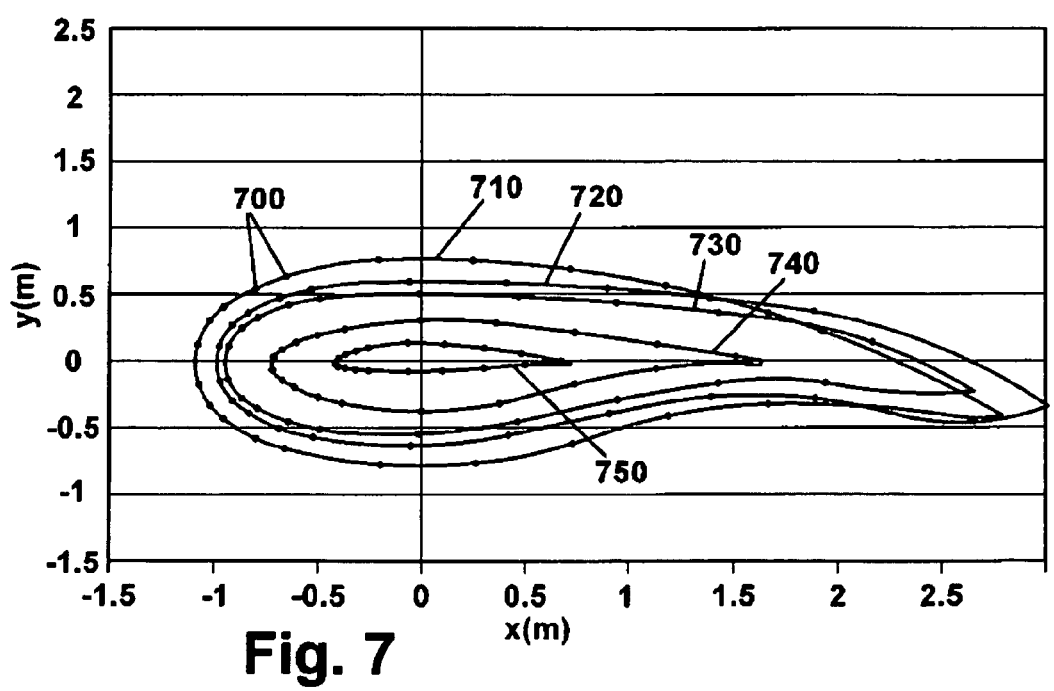

FIG. 7 illustrates an exemplary distribution of fluid dynamic resistive contact sensors 700 along chords of a wind turbine blade for a testing scheme. Groups of 20 sensors are disposed along five chords of the blade at a first position 710 of about r=47 m; a second position 720 of about r=25 m; a third position 730 of about r=16.5 m; a fourth position 740 of about r=11.5 m; and a fifth position 750 of about r=11 m, all positions with respect to the root of the blade.

Figure 8A:
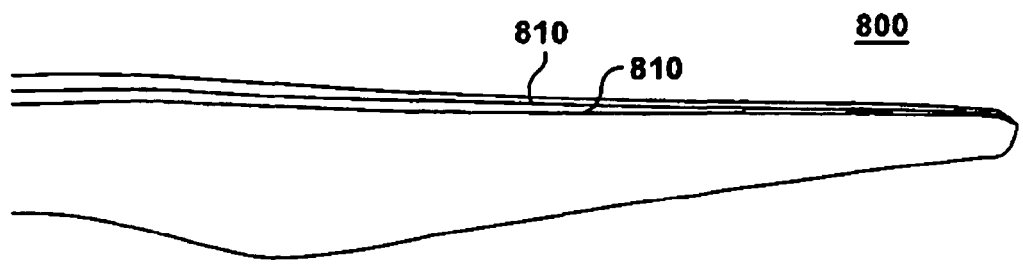
FIGS. 8A-8C illustrate sensors distributed along the full axial span of a wind turbine blade.
Figure 8B:
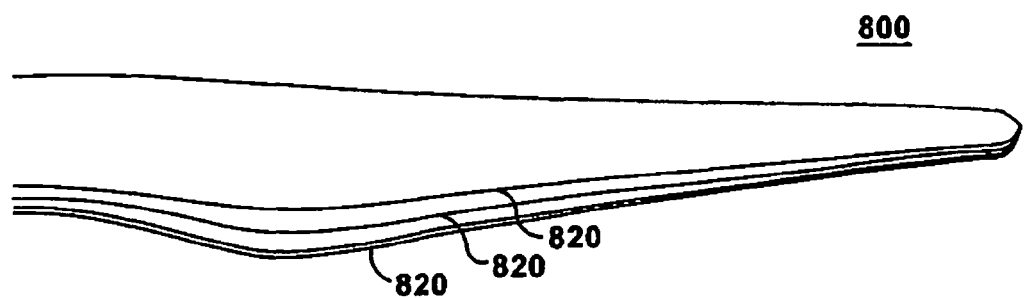
Figure 8C:
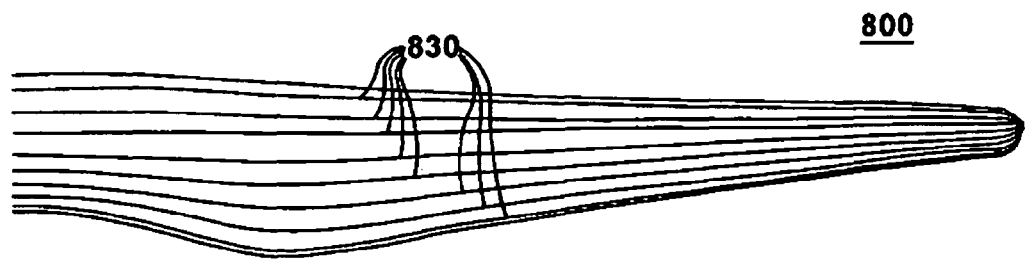

Sensors may also be distributed along the full axial span of a wind turbine blade 800. FIG. 8A illustrates a sensor distribution along full leading edge segments 810 where the sensors may, as an example, be distributed about ⅓ to an inboard section, ⅓ to a middle section, ⅓ to an outboard section, and 4% at the tip. FIG. 8B illustrates a sensor distribution along a full trailing edge segment 820 where the sensors may be, as an example, distributed about ⅓ to an inboard section, ⅓ to a middle section, ⅓ to an outboard section, and 4% at the tip. FIG. 8C illustrates a sensor distribution along full multiple spans 830 between the leading edge and the trailing edge.

Multiple sensors may further be mounted in a concentrated pattern on a specific surface section of the wind turbine blade to provide more comprehensive pressure information and from this fluid dynamic performance for the associated surface section. Further, it should be recognized that the previously described sensor patterns are exemplary and may be used in different combinations and arrangements suitable to a specific measurement or control scheme.

Figure 9:
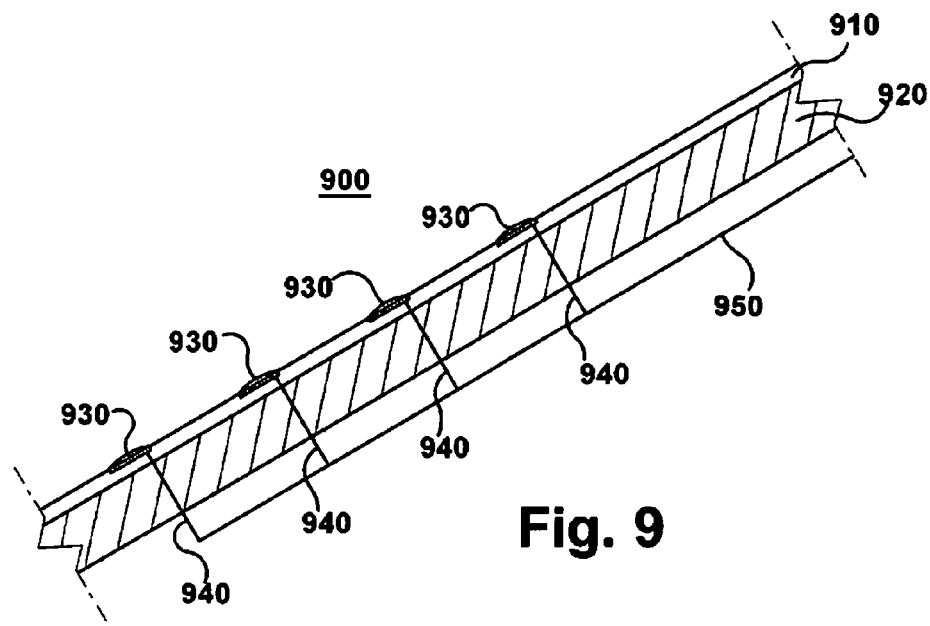
FIG. 9 illustrates sensor permanently mounted in skin of a wind turbine blade.

The wind turbine blade instrumentation structure may include mounting structures for the sensors wherein the fluid dynamic resistive contact sensors are permanently fixed in a surface of the blade. The permanent mounting in place within the surface of the blade may be provided with bonds established during a process of blade bonding. FIG. 9 illustrates sensor permanently mounted in the blade skin laminate layer 910. Sensor leads for the permanently mounted sensors may extend through the laminate 910 and core 920 of the blade to wire bundles 950 within the blade 900.

Alternately, the wind turbine blade instrumentation structure may include mounting the fluid dynamic resistive contact sensors to an exterior surface of the blade. Gluing or epoxying individual sensors to the exterior surface of the blade according to the desired predetermined pattern may provide such mounting. Such mounting may be provided for monitoring of continuing wind turbine blade performance, but may also be used more frequently for temporary test instrumentation to be used in initial installation testing, periodic performance measurement, and troubleshooting, as illustrated in FIG. 7.

As a further alternative for mounting on an exterior surface, a packaged arrangement of sensors may be provided. The packaged arrangement may include multiple sensors arranged in a predetermined pattern, where the package is attached to the exterior surface. The packaged arrangement may also include wiling for the sensors within the package. The package may further provide a glue or fastening substance on a backside for attachment to the exterior surface of the blade.

Figure 10:
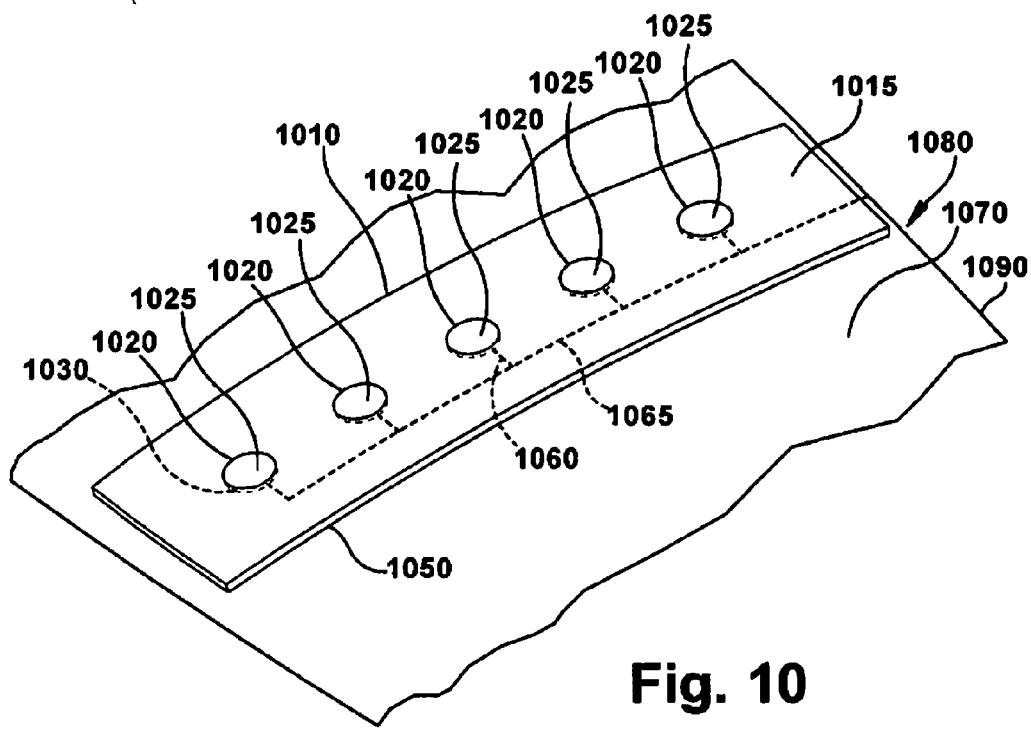
FIG. 10 illustrates an embodiment of a packaged arrangement for multiple fluid dynamic resistive contact sensors within a belt.

FIG. 10 illustrates an embodiment of a packaged arrangement may include multiple fluid dynamic resistive contact sensors 1020 arranged along a length of a belt 1010. The belt 1010 may be formed of a plastic, cloth or similar flexible material, resistant to water, wind and other elements in a wind turbine blade environment. The sensors 1020 may be mounted in the belt 1010 according to the predetermined pattern. The pressure-sensing diaphragm 1025 may be exposed to outside pressure on a top surface 1015 of the belt 1010, while the base plate 1030 is held within the belt 1010. The sensors 1020 may be glued or epoxied to the belt 1010 or may be encapsulated in the belt material with only the pressure-sensing diaphragm 1025 exposed to outside air.

The belt 1010 may be arranged, for example, to run along a chord of the blade 1080 or a part of the chord of the blade, although spanwise arrangements may also be provided. A back 1050 of the belt 1010 may be provided with glue or other adhesive for attachment to the exterior surface 1070 of the blade 1080.

The belt 1010 may further include embedded wire pairs 1060 from the sensing connections for each of the individual sensors 1020 mounted on the belt 1010. The embedded wires 1060 within the belt 1010 may be run in a bundle 1065 to a trailing edge 1090 of the blade or to a penetration (not shown) through the blade 1090, as previously described for other sensors mounted on an exterior surface.

Such a packaging can greatly facilitate application of multiple sensors on the blade exterior surface considering the difficulties associated with applying sensors to blade exterior surfaces while working at the physical heights and wind/weather conditions for the wind turbine blades. Although the packaging is illustrated as a belt, it should be appreciated that other embodiments may also be provided in different shapes, forms and arrangements within the scope of the present invention.

Figure 11:
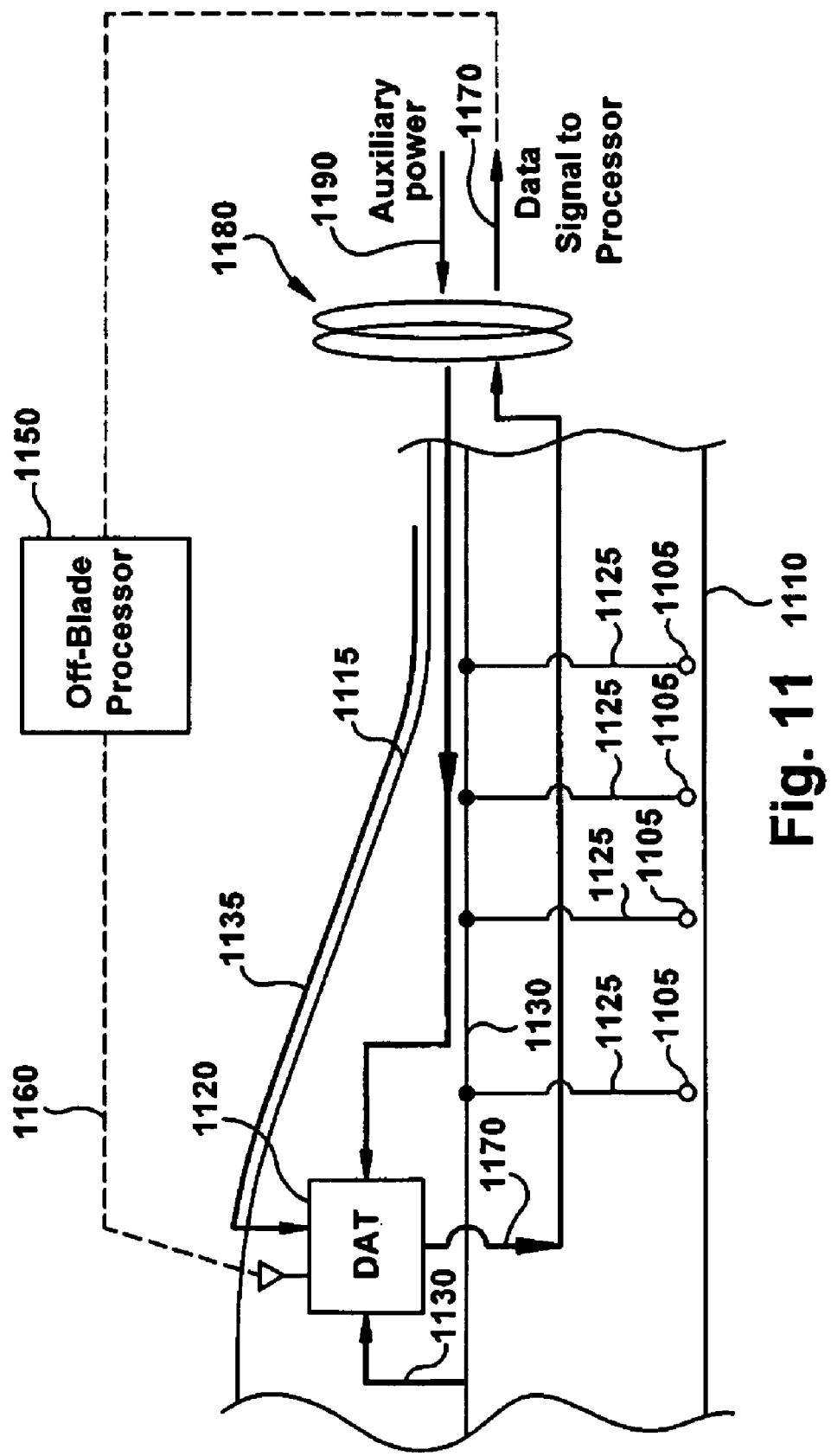
FIG. 11 illustrates embodiments for data transfer means employed with the fluid dynamic resistive contact sensors.

FIG. 11 illustrates an embodiment of means for transferring data that may be employed with the fluid dynamic resistive contact sensors. The wind turbine blade instrumentation structure 1100 includes means for communicating electrically a signal between the plurality of fluid dynamic resistive contact sensors 1105 on the blade 1110 and a data acquisition terminal (DAT) 1120. Several alternatives may be provided for placement of the DAT 1120 on or within the blade. The DAT 1120 may be surface mounted for test purposes on the blade and perform a wireless data transfer 1140 to a storage or processing location 1150 off the blade. Data from sensor wiring 1125 may be fed to the DAT 1120 through wirebundles 1130 within the blade 1110 or surface wirebundles 1135, such as along a trailing edge 1115 of the blade 1110. A DAT 1120 may be more permanently mounted within the blade, where such DAT may either provide wireless transmission 1160 off the blade or wired transmission 1170 off the blade through slip rings 1180 or similar mechanism. The DAT also may receive power 1190 through the slip rings 1180. Still further, the DAT 1120 may store data for later download.

Each fluid dynamic resistive contact sensor 1105 includes a pair of leads 1125. One lead is connected to the pressure-sensing diaphragm and a second lead connected to the base plate (See FIG. 1). The means for communicating electrically a signal between the fluid dynamic resistive contact sensors 1105 on the blade 1110 and a data acquisition terminal 1120 may include for a sensor, mounted within the surface of the blade during a process of blade bonding, the pair of leads 1125 may also be extended through a skin of the blade and a core of blade to the blade internals. Once within the blade, the pair of leads from individual sensors may be grouped into wirebundles 1130.

Figure 12A:
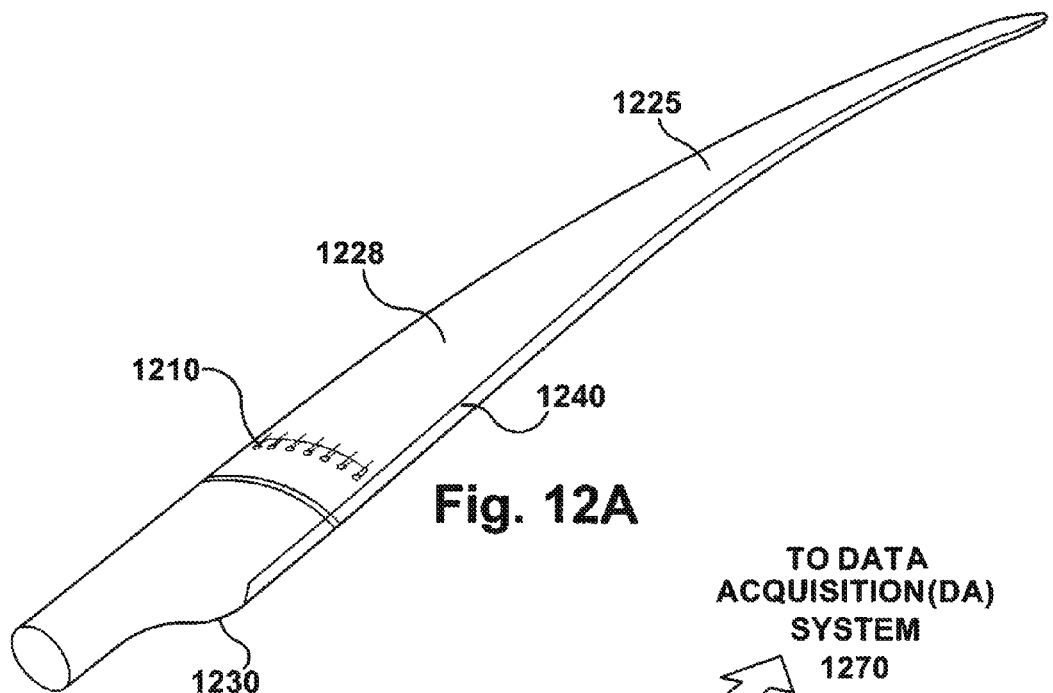
FIG. 12A illustrates an arrangement for connecting one lead from sensors mounted on a blade or wing to a trailing edge insert.
Figure 12B:
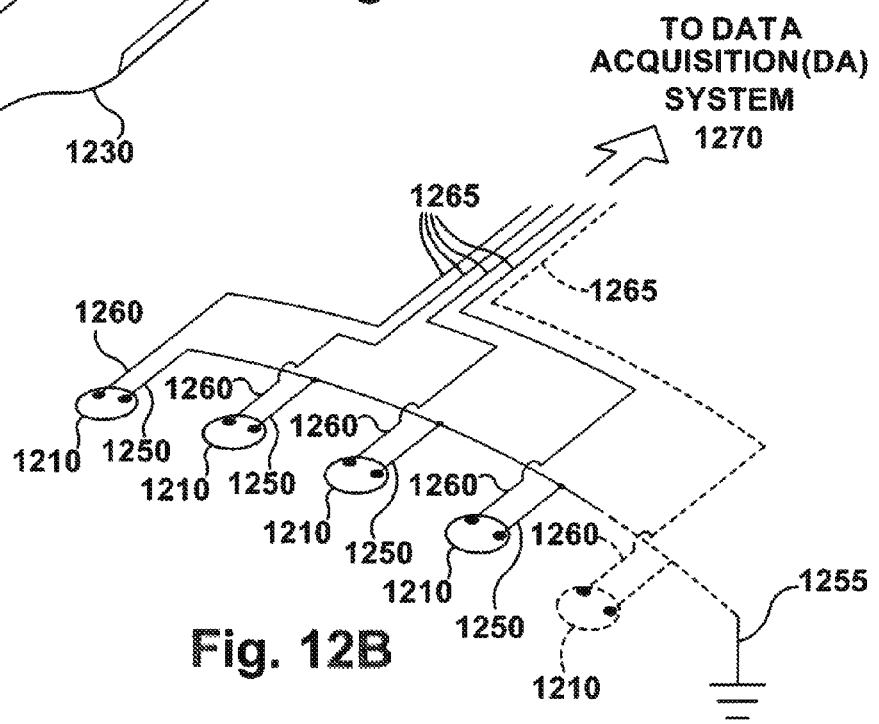
FIG. 12B illustrates an enlarged view for electrical connections from sensors on a blade or wing to a data acquisition terminal.

An arrangement may be further provided to utilize existing or alternative structures within a blade or wing to act as a common electrical path for the output from the sensors. FIG. 12A illustrates an arrangement for connecting one lead from sensors mounted on a blade or wing to a trailing edge insert. FIG. 12B illustrates an enlarged view for electrical connections from sensors on a blade or wing to a data acquisition terminal. Sensors 1210 are disposed along blade or wing 1220 Sensor wiring 1215 is layed out over the surface 1225 of the blade or wing 1220 to a trailing edge 1230. At the trailing edge 1230, a common lead 1250 of the pair of leads for the sensor wiring may be connected to a trailing edge insert 1240. The trailing edge insert 1240 may be comprised of an electrically conductive material. The common lead 1250 for the sensors 1210 may be connected through the trailing edge insert to a data acquisition system common or ground 1255. A high side or signal lead 1260 from each sensor 1210 may be connected to individual channels 1265 of the data acquisition system 1270. Use of the trailing edge insert substantially reduces wiling within the blade. Longitudinal routing of signal leads 1260 to the data acquisition system may be in accordance with FIG. 6A-E. It should be appreciated that other embodiments of the present invention may also be provided in with alternate arrangements and number of sensors, location of sensors, and wiring of sensors.

In an alternative arrangement, the blade may not have an electrically conductive trailing edge insert. Instead, the invention would use a lightning cable or other type conductor, which typically is arranged along the inside of the blade from tip to root. The common leads may be grounded as part of a lighting protection system or may be designed as the primary lighting protection system. The method for connecting the sensors to the lightning cable or other conductors would be substantially similar.

In an alternate wind turbine blade instrumentation structure, the means for communicating electrically between the sensor with wiring disposed along a surface of blade and the DAT, the pair of leads from each individual sensor may extend along a surface of the blade to a trailing edge and be routed along the trailing edge. At the trailing edge, pairs of leads from multiple sensors may be joined into one or more wire bundles.

In a further alternative version of the wind turbine blade instrumentation structure, the means for communicating electrically may include a penetration disposed through a skin and a core of the blade in proximity to an area of multiple sensors. The area of multiple sensors may be formed along a surface of the blade, for example in one of the arrangements of interest as previously described. The pair of leads (wiring) 1320 from each of the individual fluid dynamic resistive contact sensors 1310 formed in an area of the blade 1340 may pass through a penetration 1330 in the blade. A wirebundle may be provided within the blade, adapted for accepting pairs of leads from the individual surface mounted sensors. The wirebundle within the blade may be connected to a wireless DAT within the blade or routed off the blade as previously described.

Figure 13:
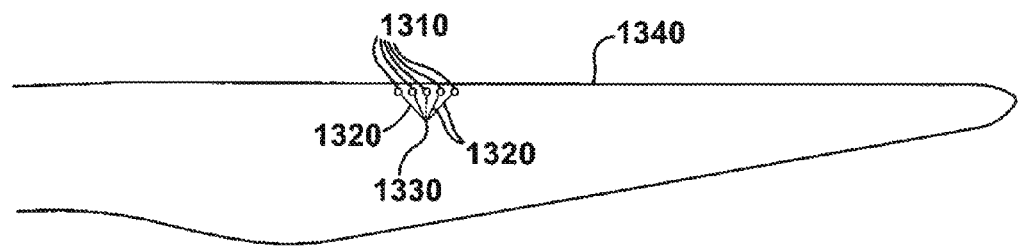
FIG. 13 illustrates an alternate arrangement for connection of sensors with a local penetration through a skin of a blade.

A common lead of the pair of leads from each sensor may be tied to a common electrical path that may already exist within the blade. For instance, a lightning protection system may include a sturdy conductor running internally along the span of the blade and include conductive elements running to the surface of the blade. A connection from one wire of the sensor may be made to the internal span or to the surface conductive paths of the lighting protection system. Alternatively, conductive trailing edge inserts, used in some blade systems may be employed as a common connection path, as shown in FIG. 13. With the common lead tied through the common paths described above, only one signal lead of the pair of leads for each sensor need be run within the wirebundle.

In another aspect of the wind turbine blade instrumentation structure the data acquisition terminal may transfer the resistance value from the converter to a processor device adapted for converting the resistance value to a pressure value. The pressure values provided by the contact sensors along a chord of the blade may further be processed by the processor device, such as 1150 in FIG. 11, to determine aerodynamic performance characteristics of the blade. More specifically, the pressure measurements along a chord of the blade may be used for determination of flow separation, as illustrated in FIG. 2. Pressure measurements from the sensors in the various configurations, as illustrated in FIGS. 4A-4D, FIGS. 5A-5E, and FIGS. 8A-8C, and other concentrated patterns may further be used to detect flow separation, stagnation point, angle of attack, lift and drag and wind speed. Further, with post-processing techniques applied to the pressure distribution, wind shear, up-flow and yaw error may be determined.

While various embodiments are described herein, it will be appreciated from the specification that various combinations of elements, variations or improvements therein may be made, and are within the scope of the invention.

The invention claimed is:

1. An fluid dynamic resistive contact sensor, adapted for measuring a fluid pressure on an airfoil, comprising:
   a pressure-sensitive element comprising a conductive composite material formed of a polymer and a conductive filler;
   an electrically-conductive base plate operatively connected to one end of the pressure-sensitive element;
   an electrically-conductive pressure-sensing diaphragm operatively connected to a second end of the pressure-sensitive element for applying a preload and an ambient pressure-related force to the pressure-sensitive element;
an electrical insulator separating the base plate and the pressure-sensing diaphragm;
means for engaging the pressure-sensing diaphragm to the baseplate; and
means for supplying an electric current through the pressure-sensitive element.

2. The fluid dynamic resistive contact sensor according to claim 1 wherein the conductive composite material presents a varying electrical resistance between the base plate and the pressure-sensing diaphragm according to an ambient pressure on an outer surface of the pressure-sensing diaphragm.

3. The fluid dynamic resistive contact sensor according to claim 1, wherein the pressure-sensitive element comprises: a disc-shaped element.

4. The fluid dynamic resistive contact sensor according to claim 1, wherein the electrically-conductive pressure-sensing diaphragm comprises: a metallic film stretched over a second end of the pressure-sensitive element forming a dome.

5. The fluid dynamic resistive contact sensor according to claim 4, wherein the electrical insulator comprises: at least one of an epoxy membrane between an outer peripheral base of the pressure-sensing diaphragm and an outer peripheral surface of the base plate and an epoxy membrane including a paper washer between an outer peripheral base of the pressure-sensing diaphragm and an outer peripheral surface of the base plate.

6. The fluid dynamic resistive contact sensor according to claim 5 wherein means for engaging the pressure-sensing diaphragm to the base plate comprises: the epoxy membrane between the outer peripheral base of the pressure-sensing diaphragm and the outer peripheral surface of the base plate, binding the pressure-sensing diaphragm to the base plate.

7. The fluid dynamic resistive contact sensor according to claim 5, wherein means for engaging the pressure-sensing diaphragm to the base plate comprises: an electrically insulating clamp applied between an outer edge of the outer peripheral base of the pressure-sensing diaphragm and the outer edge of the outer peripheral surface of the base plate, binding the pressure-sensing diaphragm to the base plate.

8. The fluid dynamic resistive contact sensor according to claim 1, wherein means for engaging the pressure-sensing diaphragm to the base plate comprises: the pressure-sensing diaphragm applying a preload to the pressure-sensitive element.

9. The fluid dynamic resistive contact sensor according to claim 8, wherein an amount of the preload applied to the pressure-sensitive element is established by positioning the pressure-sensing diaphragm over the pressure-sensitive element and engaging the pressure-sensing diaphragm to the base plate.

10. The fluid dynamic resistive contact sensor according to claim 9, further comprising an internal cavity within which a vacuum is established.

11. The fluid dynamic resistive contact sensor according to claim 10, wherein the pressure-sensitive element comprises: at least one of a convex top surface including a crown wherein the crown engages with an underside of the pressure-sensing diaphragm and a flat top surface which engages and underside of the pressure-sensing diaphragm.

12. The method for making a fluid dynamic resistive contact sensor according to claim 1, further comprising:
maintaining a height of the fluid dynamic resistive contact sensor to less than a height for a boundary layer of airflow on a blade; and
providing a contoured profile for the sensor up to the height.

13. A method for making a fluid dynamic resistive contact sensor adapted for measurement of fluid pressure comprising:
providing an electrically-conductive base plate;
mounting one end of a pressure-sensitive element comprising a conductive composite material formed of a polymer and a conductive filler on the electrically-conductive base plate;
mounting an electrically-conductive pressure-sensing diaphragm over a second end of the pressure-sensitive element;
electrically isolating the electrically-conductive pressure-sensing diaphragm from the electrically-conductive base plate; and
engaging the electrically-conductive pressure-sensing diaphragm with the electrically-conductive base plate.

14. The method for making a fluid dynamic resistive contact sensor according to claim 13, the step of mounting an electrically conductive pressure-sensing diaphragm comprises:
positioning the pressure-sensing diaphragm over a second end of the electrically-conductive pressure-sensitive element to form a dome over the electrically-conductive base plate.

15. The method for making a fluid dynamic resistive contact sensor according to claim 13, the step of electrically isolating comprises: inserting an electrical insulator between an outer peripheral base of the electrically-conductive pressure-sensing diaphragm and an outer peripheral surface of the electrically-conductive base plate, wherein the electrical insulator includes at least one of inserting an epoxy membrane or a composite membrane based on paper film or other washer with expoxy.

16. The method for making a fluid dynamic resistive contact sensor according to claim 13, the step of engaging the pressure-sensing diaphragm with the base plate further comprises: positioning the pressure-sensing diaphragm to establish a designated preload on the pressure-sensitive element.

17. The method for making a fluid dynamic resistive contact sensor according to claim 13, the step of engaging the pressure-sensing diaphragm with the base plate further comprises: drawing a vacumn on the internal cavity between the pressure-sensing diaphragm and the pressure-sensistive element.

18. The method for making a fluid dynamic resistive contact sensor, the step of engaging the pressure-sensing diaphragm with the base plate according to step 18 further comprises: engaging an outer peripheral base of the the pressure-sensing diaphragm to an outer peripheral surface of the base plate with a membrane, including at least one of an epoxy membrane and a composite membrane of epoxy and a paper washer.

19. The method for making a fluid dynamic resistive contact sensor, the step of engaging the pressure-sensing diaphragm with the base plate according to step 18 further comprises: engaging an outer peripheral base of the the pressure-sensing diaphragm to an outer peripheral surface of the base plate with an electrically insulating clamp.

20. The method for making a fluid dynamic resistive contact sensor, the step of positioning the pressure-sensing diaphragm to establish a designated preload on the pressure-sensitive element according to step 20 comprises: establishing a minimum for the designated preload according to an anticipated range of ambient pressure below the nominal ambient pressure.

* * * * *